United States Patent [19]

Guthrie

[11] Patent Number: 4,484,602

[45] Date of Patent: Nov. 27, 1984

[54] PACKER FOR SEALING LATERAL LINES

[75] Inventor: Kenneth R. Guthrie, Orlando, Fla.

[73] Assignee: Cues, Inc., Orlando, Fla.

[21] Appl. No.: 458,628

[22] Filed: Jan. 17, 1983

[51] Int. Cl.³ .............................................. F16L 55/12
[52] U.S. Cl. ..................................... 138/93; 277/34.3
[58] Field of Search ....................... 138/89, 91, 93, 94; 277/34.3

[56] References Cited

U.S. PATENT DOCUMENTS

| 3,103,235 | 9/1963 | Stringham | 138/93 |
| 3,457,959 | 7/1969 | Cooper | 138/94 |
| 4,144,908 | 3/1979 | Dunn | 138/93 |
| 4,314,577 | 2/1982 | Brister | 138/91 |

Primary Examiner—Robert I. Smith
Attorney, Agent, or Firm—Epstein & Edell

[57] ABSTRACT

A method and apparatus for detecting and sealing leaks in a sewer branch pipe including a packer member which travels along the main sewer pipe by remote control. When the packer is correctly located, the main pipe region surrounding the branch entrance is sealed off. The packer is rotated until a slot in the packer is orientated to the branch. An inflatable tube in the packer is then inflated, causing the tube to elongate and enter the branch. The remote end of the tube forms a seal against the inside of the branch so that the area of the branch near the junction with the main pipe is included in the sealed off area. Fluid can be pumped into the sealed off space to detect if a leak is present; in which case a sealant fluid is pumped into the space. Afterwards, the tube can be deflated and retracted and the traveller repositioned at the next branch. The disclosure includes a method of detecting and sealing leaks, in which an inflatable tube is used to provide a means to enter the branch, and to seal the branch away from its junction with the main pipe.

22 Claims, 10 Drawing Figures

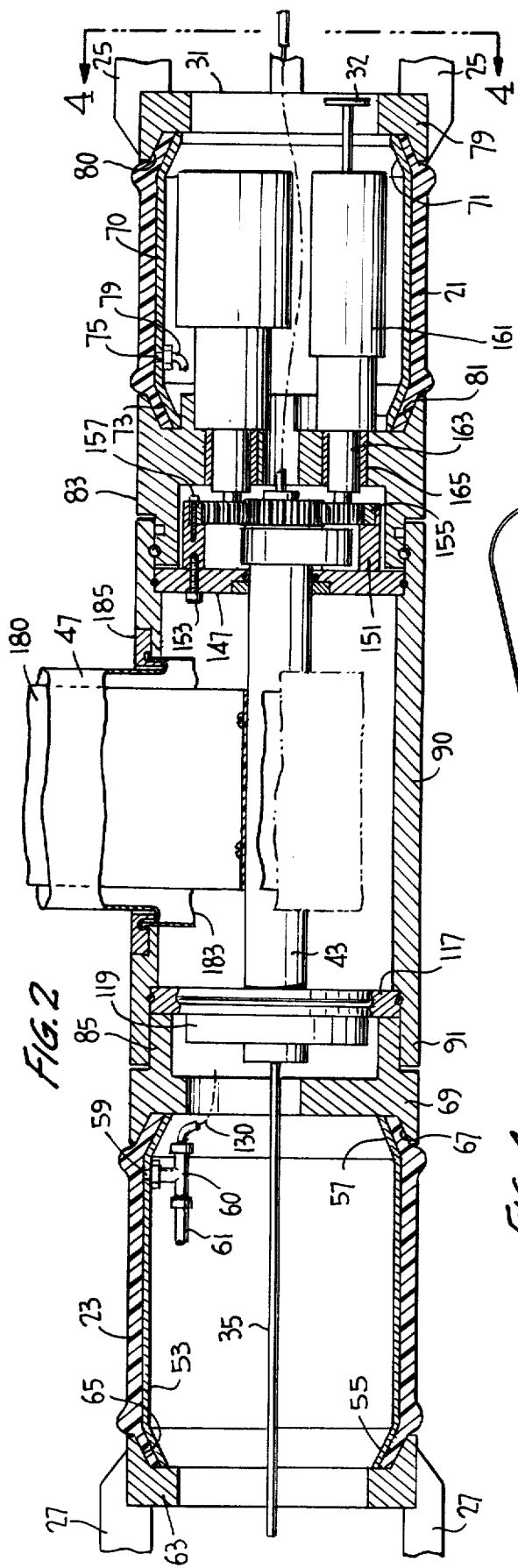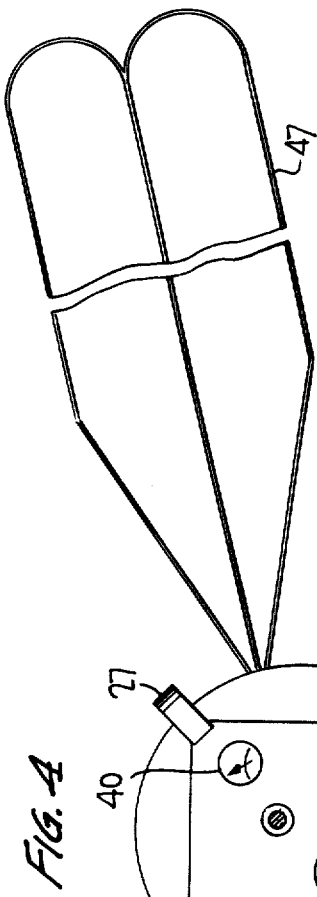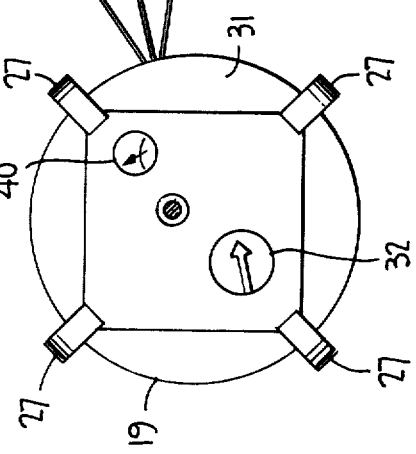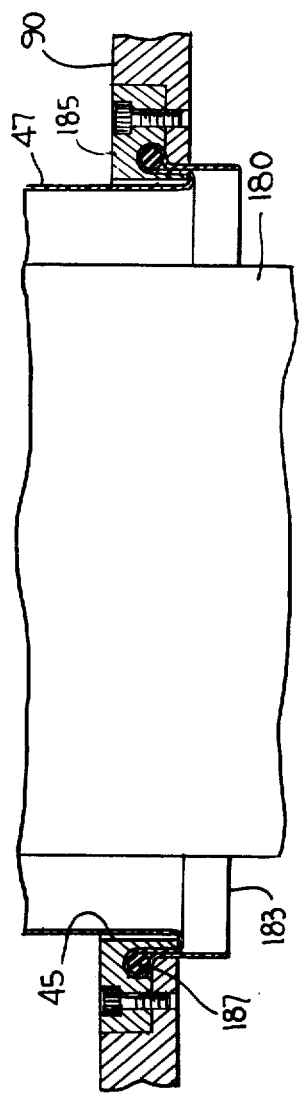

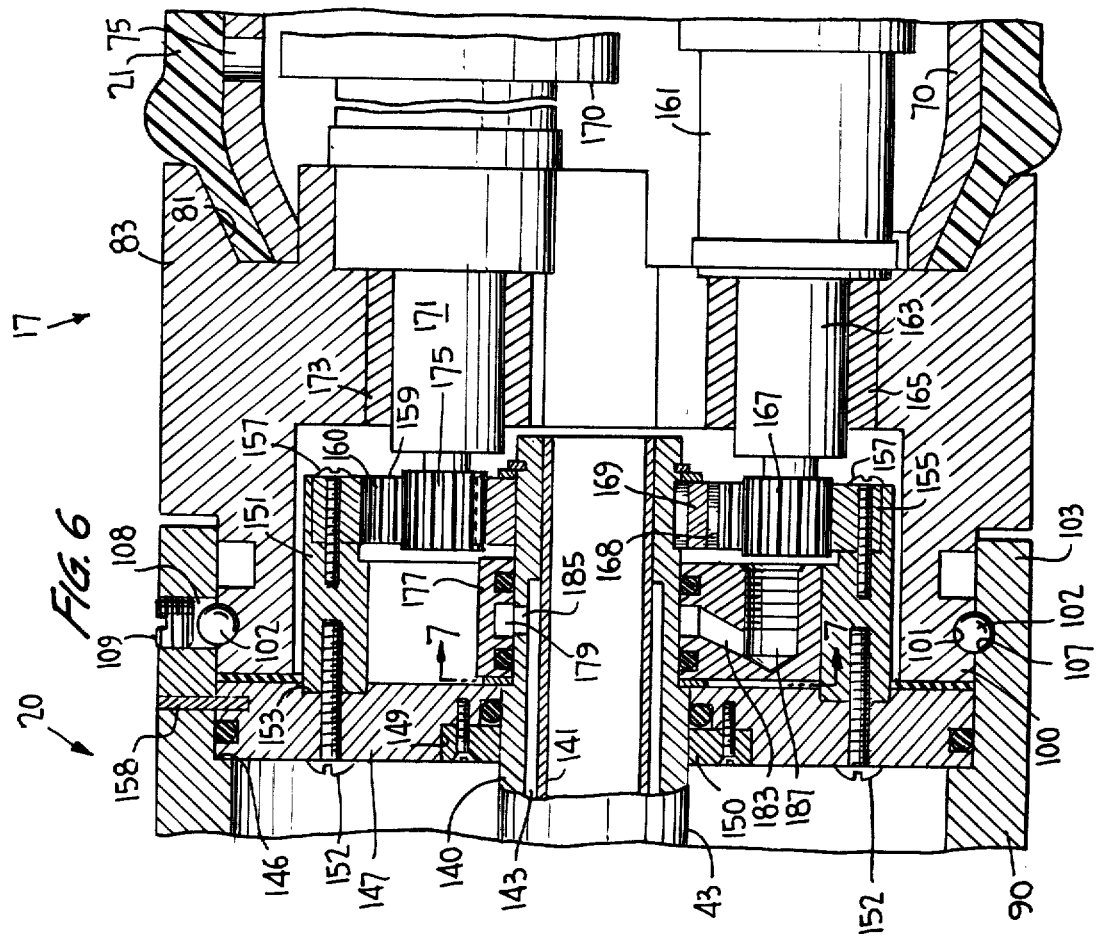
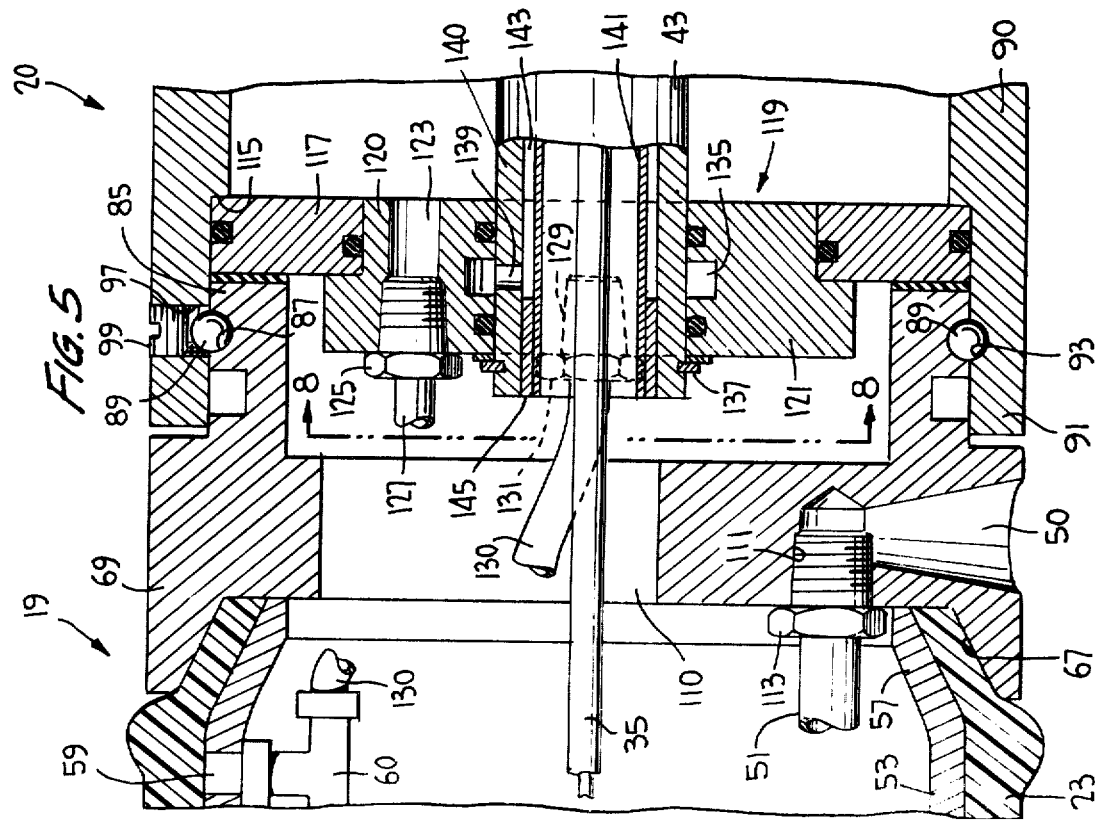

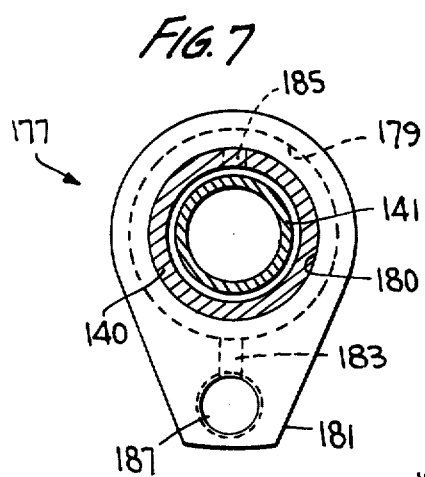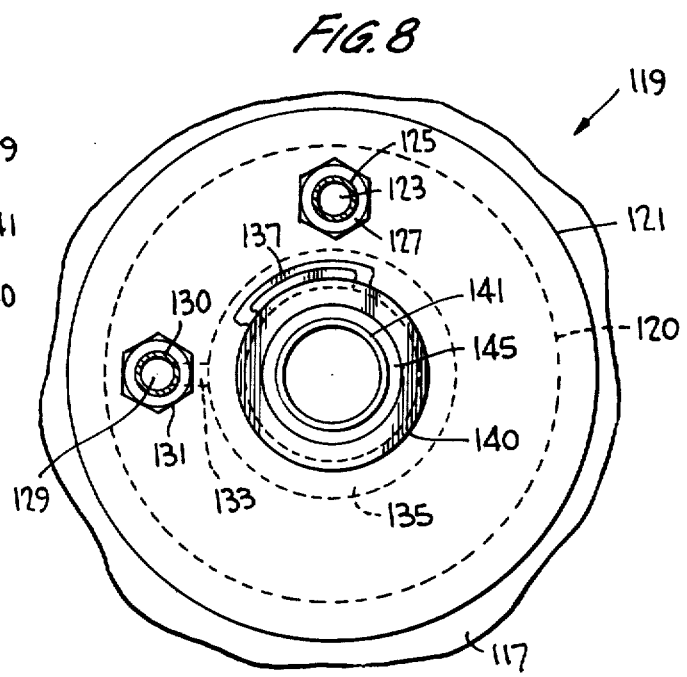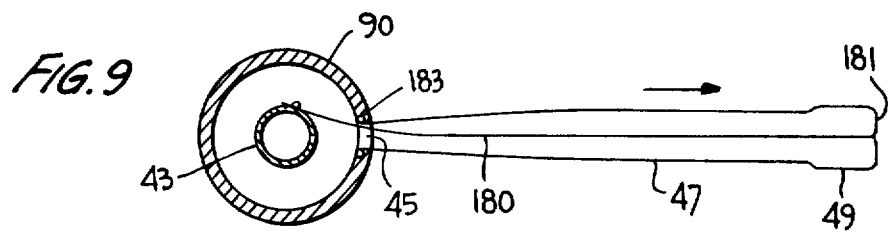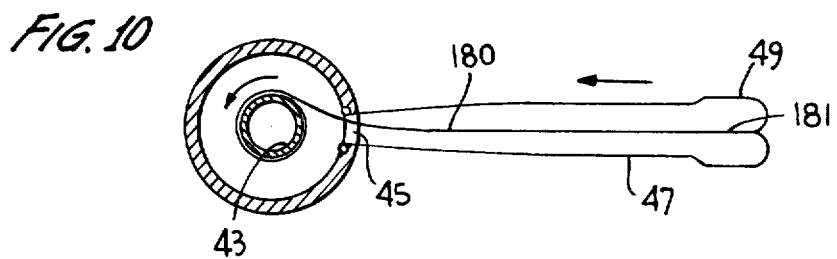

PACKER FOR SEALING LATERAL LINES

BACKGROUND OF THE INVENTION

1. Technical Field

The present invention relates to a method and apparatus for detecting and sealing leaks in a branch pipe which extends laterally from a main pipe. More particularly, the invention is concerned with detecting and sealing leaks in building service lateral sewer pipes from a point at which such pipes extend from the main sewer line. The preferred embodiment of the present invention is described in terms of sealing sewer lines; however, it is to be understood that the principles of the present invention apply equally to any pipe system wherein a branch pipe extends laterally from a main pipe.

2. The Prior Art

In recent years there has been an enormous amount of money spent on evaluation studies to quantify and detect the source of extraneous water infiltration into sanitary sewer systems. Usually, after these evaluation studies are completed, a rehabilitation program is developed to repair the points of infiltration. Such repairs are grouped into three segments of a sewer system, namely manholes, main sewer lines and building service laterals. Manhole repair is achieved by grouting, recoating and/or replacement. Main sewer lines are grouted, sliplined or excavated as required. However, there is no reasonable cost-effective method for repairing building service lateral sewer lines. Excavations and other methods which have been tried have resulted in severe public relations problems for the controlling municipality with the property owners.

Several municipal sewer system projects have been completed through the rehabilitation phase, after which after-the-fact studies were conducted. Many of these studies indicated that, once the manholes and main sewer lines are fixed, the extraneous water source migrates to the building service lateral and continues leaking at a rate similar to that of the pre-rehabilitation condition.

OBJECTS AND SUMMARY OF THE INVENTION

It is an object of the present invention to provide a method and apparatus for the detecting and sealing leaks in building service lateral sewer lines.

It is another object of the present invention to provide a method and apparatus for detecting and sealing leaks in branch pipes from a location in a main pipe from which the branch pipe transversely extends.

A further object of the present invention is to provide an environmentally acceptable method and apparatus, which is acceptable also to building owners and users, for detecting and sealing leaks in building service lateral sewer lines.

It is still another object of the present invention to provide a method and apparatus for detecting and sealing leaks in a building service lateral sewer line from a location in a main sewer with which the lateral line intersects.

In accordance with the present invention an inflatable tube or bag is projected into a lateral line from the main sewer line. The inflatable tube is normally stored in a collapsed form in an intermediate section, disposed between two end sections, of a packer apparatus. The packer is translated along the main sewer line until its intermediate section is longitudinally aligned with the lateral line entrance. Bladders in the end sections are inflated to create a sealed-off length of the main line at the lateral line entrance. The intermediate section of the packer is then rotated about the packer longitudinal axis until an egress opening in the intermediate section is angularly aligned with the lateral line entrance. Pressurized gas is applied to the interior of the intermediate section to cause the inflatable tube to evert into the lateral line. When the tube is fully extended its distal end is flush against the lateral line wall, thereby creating a sealed annular space about the inflated tube disposed in the lateral line. Test fluid and/or sealant fluid may be injected under pressure into the sealed-off main line section and the sealed angular space to test for leaks and to seal any leaks which are detected. A pressure transducer monitors the pressure in the sealed space, when test fluid is injected therein, in order to determine if a leak is present.

Passage of bladder-inflating gas from one end section to the other is achieved through an annular space between two concentric rigid tubes which make up a rotatable shaft on which the inflatable tube is wound in its collapsed state. One end of the packer serves as a housing for two motors, one of which rotatably drives the intermediate packer section to angularly aligne the egress opening with the lateral line entrance. The other motor drives the rotatable shaft to pay out the inflatable tube during inflation and to rewind the tube when it is collapsed for retraction into the intermediate section.

The everting inflatable tube has a non-inflatable tail at one end which is secured to the rotatable shaft. The other tube end is open and sealed about the border of the egress opening of the intermediate section. Pressurization of the intermediate section interior causes the tube to evert until it is fully extended in the lateral line with the tail extending longitudinally within and throughout the entire length of the everted tube.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein:

FIG. 2 is a view in longitudinal section of the packer apparatus of FIG. 1;

FIG. 3 is a detailed view in section of the egress outlet for the plastic bag in the intermediate section of the packer of FIGS. 1 and 2;

FIG. 4 is an end view of the packer of FIG. 2 taken along lines 4—4;

FIG. 5 is an enlarged view in section of one end of the intermediate section and its adjacent end section of the packer of FIG. 2;

FIG. 6 is an enlarged view in section of the other end of the intermediate section and its adjacent end section of the packer of FIG. 2;

FIG. 7 is a view in section taken along lines 7—7 of FIG. 6;

FIG. 8 is a view in section taken along lines 8—8 of FIG. 5;

FIG. 9 is a diagrammatic view illustrating the inflatable tube of the packer of the present invention being everted; and FIG. 10 is a diagrammatic view of the inflatable bag of the packer of the present invention being retracted.

DESCRIPTION OF THE PREFERRED EMBODIMENTS

Figure 1:
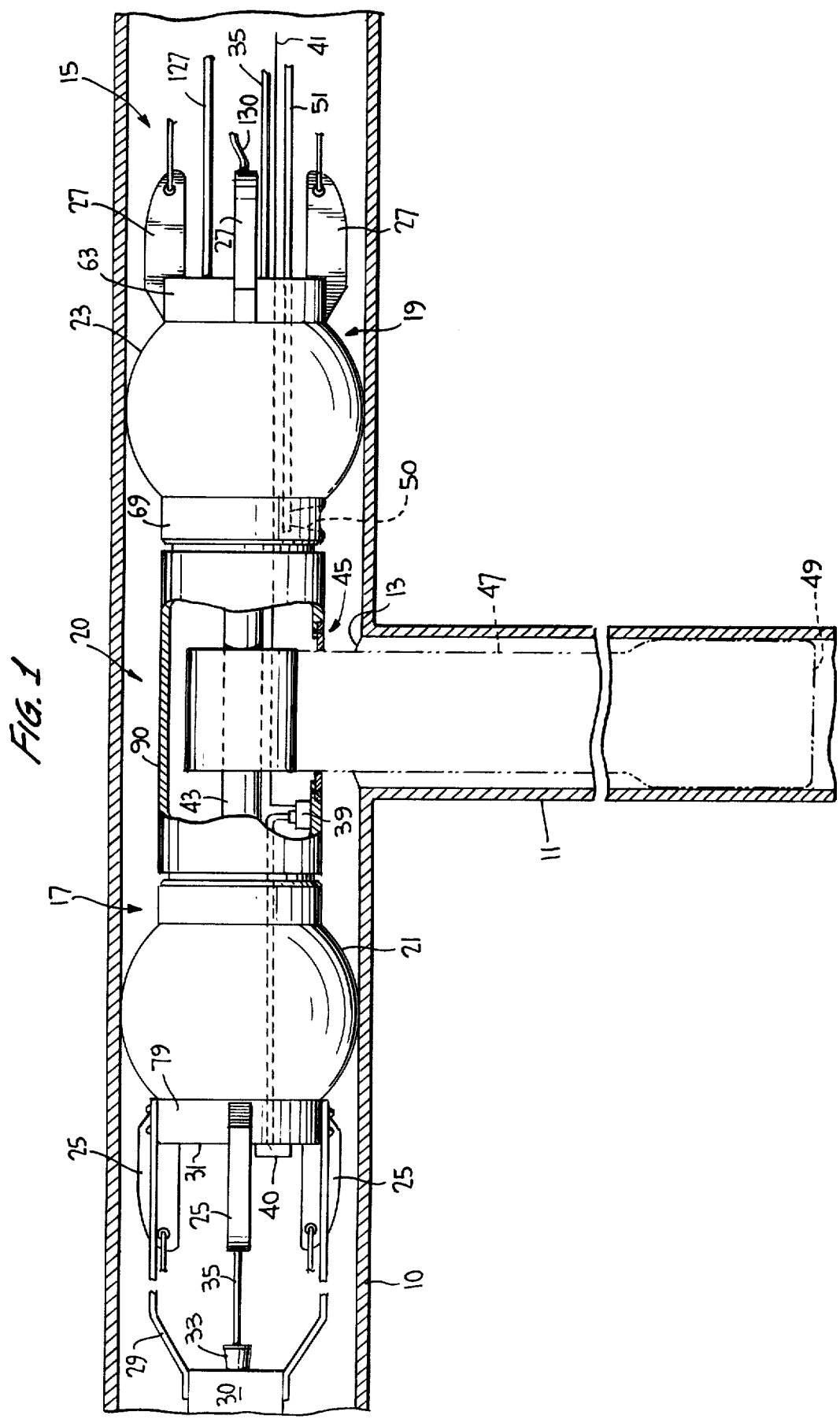
FIG. 1 is a view in section of a portion of a main sewer line intersecting a building service lateral sewer line and in which a packer apparatus of the present invention is illustrated in its deployed state.

Referring specifically to FIG. 1 of the accompanying drawings, a main sewer pipe line 10 has a building service lateral sewer pipe line 11 extending transversely therefrom. A flow communication interface 13 between the main pipe line 10 and the lateral pipe line 11 corresponds to a peripheral opening in the main line. A packer apparatus, generally designated by the reference numeral 15, is of the general type of apparatus described and illustrated in U.S. Pat. No. 3,618,639 (to Daley et al) and U.S. Pat. No. 3,750,711 (to Conklin et al), the entire disclosures of which are expressly incorporated herein by reference. Packer 15 has two axially or longitudinally spaced end sections 17 and 19 disposed at opposite ends of an intermediate section 20. The end sections 17 and 19 and the intermediate section 20 are generally cylindrical members disposed concentrically about the central longitudinal axis of the packer 15. End members 17 and 19 each have a selectively inflatable bladder member 21 and 23, respectively, which takes the form of a resilient sleeve. When inflated, as shown in FIG. 1, the bladder members 21, 23 are expandable beyond the diameter of the main sewer line 10 so that they are compressed by the wall of pipe 10 and create a sealed space between the bladders and around intermediate section 20. When bladder members 21, 23 are deflated, they have diameters considerably smaller then that of the main pipeline 10, as is the case for the rest of the packer unit 15. When the bladder members are deflated, the packer unit 15 may be translated longitudinally through main pipe line 10 from access openings, such as manholes, by a winch or the like in a manner which is quite conventional. For example, apparatus for translating a packer longitudinally through a sewer is described and illustrated in U.S. Pat. No. 2,851,061 (to Bernard et al). The access opening for an operator station from which the packer is monitored and controlled is to the right (as viewed in FIG. 1) of end member 19 so that end member 17 is remote from the operator station. A plurality of conventional skid members 25 extend longitudinally from end section 17 and a similar plurality of skid members 27 extend in the opposite direction from end section 19. The skid members have smoothly curved radially-outward facing surfaces to facilitate smooth translation of the packer along the walls of pipe line 10 when the bladder members 21, 23 are deflated.

A television camera 30 is secured by means of a towing system 29, or the like, to end section 17 so as to view the remote end surface 31 of that end section. The use of such television cameras as part of a closed circuit television system in conjunction with sewer line packer systems is well known, as described in conjunction with the aforesaid Conklin et al patent. The lens 33 of television camera 30 has a sufficiently wide viewing angle to permit both end surface 31 and the surrounding walls of main pipe line 10 to be observed at a television monitor located in a van or other operator station. A cable 35 carries all the electrical connections for the television camera 30 and motors to be described hereinbelow and extends longitudinally through the entire packer unit 15 and main pipe line 10 to the operator station.

A pressure transducer 39 is disposed in end section 17 of intermediate section 20 (as illustrated in FIG. 1) to measure the pressure in the sealed space between inflated bladder members 21, 23. Transducer 39 is operatively connected to a gauge 40 disposed at end surface 31 in the field of view of television camera 30 so that the pressure in the sealed space can be monitored at the operator station by the closed television system. Alternatively, or additionally, the transducer 39 can be directly connected to a remote gauge located at the operator station by means of a cable 41.

The outer cylindrical wall of intermediate section 20 is rotatable about the packer longitudinal access, relative to the end sections 17, 19, in a manner described hereinbelow. A rotatable shaft 43 extends longitudinally in intermediate section 20 and is rotatable about its longitudinal axis independently of the outer wall of section 20. An egress or peripheral opening in the intermediate section outer wall takes the form of a longitudinally-extending slot 45. A selectively inflatable elongated bag or tube 47 is wound about rotatable shaft 43 when the tube is collapsed and can be inflated to project out through the egress opening or slot 45. Tube 47 can be inflated so as to project into the lateral pipe line 11 in its inflated condition. The distal end 49 of the inflated tube 47 has a larger cross-section over a short portion of its length then the rest of the inflated tube. This larger cross-section is sufficient to expand against the inner wall of lateral pipe line 11, whereas the rest of the tube length is annularly spaced from the pipe line wall. The enlarged distal end 49 thereby creates a seal in lateral pipe line 11, which seal cooperates with the seal defined between bladder members 21 and 23 located on opposite sides of the flow communication interface 13 for the lateral pipeline. The result is a sealed region including the sealed-off space between the bladder members in the main pipe line 10 and the annular space surrounding tube 47 in the lateral pipe line 11.

A nozzle or outlet port 50 is defined in end section 19 and is arranged to issue test fluid or sealant fluid into the sealed region. Outlet port 50 receives these fluids, under the control of the operator station, from a hose 51.

Before considering the internal components of the packer unit in detail, it is to be understood that the unit is translated longitudinally in main pipe line 10 until the intermediate section 20 is seen by the closed circuit television system to be longitudinally aligned with flow communication interface 13. Bladder members 21 and 23 are then inflated to create the seal in main pipe line 10 to include interface 13 in the sealed off space. Intermediate section 20 is rotated until slot 45 is angularly aligned with interface 13. Indication of this angular alignment is had by virture of the closed circuit television monitoring system which views an indicator 32 (see FIG. 4 and FIG. 2) that is rotatable with section 20 and which points in the angular direction faced by slot 45. Tube 47 can then be inflated and projected out through slot 45 and through interface 13 into the lateral pipe line 11 to create the required sealed region in the lateral pipe line. Test fluid injected into this region via port 50 creates a pressure which should be maintained if there are no leaks in the sealed region. If the pressure, as viewed at gauge 40 or a remotely located gauge, cannot be maintained, a leak in the lateral line is indicated and must be sealed. Sealing is effected by injecting a suitable sealant chemical fluid into the sealed region via port 50. Such sealant chemicals and their operation in sealing pipe line leaks are well known, as described in the aforementioned Daley et al and Conklin et al patents. After the grouting or sealing operation is completed, or if no leak is detected in the lateral line, tube 47 is deflated and rewound about rotatable shaft 43. If desired, the operation can be repeated to test the repair effectiveness; if not, the bladder members 21 and 23 are deflated and the packer is translated through the main pipe line to the next lateral line interface.

Referring now specifically to FIGS. 2–8, wherein end sections 17 and 19 are disposed in opposite orientation to that of FIG. 1, end section 19 includes a hollow, open-ended, generally cylindrical member 53 which is disposed concentrically about the packer central longitudinal axis and which converges to reduced diameter portions 55, 57 at its ends. Bladder member 23 is an annular elastomeric sleeve having an inter wall which conforms to the outer wall of member 53 along its entire periphery and length. A port or hole 59 is defined through member 53 and is connected to a T-connector 60 which receives pressurized air or other gas from hose 61. The outboard end of end section 19 is provided with an annular end member 63 having a frusto-conical interior lip portion 65 which seals the outboard end of bladder member 23 to end region 55 of member 53. This sealing may, for example, be effected in the manner described in the aforesaid Daley et al patent. The other end of bladder member 23 is sealed against inboard end portion 57 of member 53 by a similar frusto-conical interior portion 67 of a bearing head member 69.

A similar construction is present at end section 17 wherein a hollow, open-ended, cylindrical member 70 is disposed concentrically about the packer central longitudinal axis and converges to reduced diameter end portions 71 and 73. Bladder member 21 is an annular elastomeric sleeve having an inner wall which conforms to member 70. A port or hole 75 is defined through member 70 and is connected to a hose fitting which receives pressurized air or other gas from a hose 77. The outboard end of end section 17 is provided with an annular end member 79 having a frusto-conical interior lip portion 80 which seals the outboard end of bladder member 21 to end region 71 of member 70. The other end of bladder member 21 is sealed against inboard end portion 73 of member 70 by a similar frusto-conical interior portion 81 of a head bearing member 83.

Head bearing member 69 in end section 19 includes a radially-recessed annular segment 85 at its inboard end. A radially-outward facing bearing surface of recessed segment 85 has an annular recess 87 of semi-circular cross-section defined therein. Recess 87 serves as one side of a raceway for bearing balls 89. Intermediate section 20 includes an outer hollow cylindrical member 90. An annular end segment 91 of cylinder 90 overlies head bearing segment 85 and has an annular recess 93 of semi-circular cross-section defined along its inner surface. Annular recess 93 is axially aligned with recess 87 and serves as the other side of the raceway for bearing balls 89. A tapped hole 97 in cylinder segment 91 provides access to the raceway and is normally sealed by a setscrew 99.

Head bearing member 83 in end section 17 includes a radially-recessed annular segment 100 at its inboard end. A radially-outward facing bearing surface of segment 100 has an annular recess 101 of semi-circular cross-section defined therein. Recess 101 serves as one side of a second raceway for bearing balls 102. The outer cylindrical member 90 of intermediate section 20 has another annular end segment 103 at the cylinder end opposite segment 91. Annular end segment 103 overlies the annular end segment 100 of head bearing 83 and includes an annular recess 107 of semi-circular cross-section defined along its inter surface. Annular recess 107 is axially aligned with recess 101 and serves as the second half of the other raceway for bearing balls 102. Tapped hole 108 in segment 103 provides access to this raceway and is normally sealed by setscrew 109.

Bearing head 69 in end section 19 includes one or more axial through openings 110 which permit passage of cables, hoses and the like through the bearing head to the intermediate section 20. In addition, a tapped axially-directed bore 111 is defined partially through bearing head 69 and communicates with radially-oriented outflow port 50. Bore 111 receives a hose fitting 113 to which an end of the test fluid/sealant fluid hose 51 is connected after passing through cylindrical member 53 of end section 19. Bearing head 69 thus serves the multiple functions of conducting test fluid and/or sealant fluid to the sealed space, passing other electrical cables and hoses to intermediate section 20, and providing a bearing portion of end section 19 on which cylinder 90 of the intermediate section 20 rotates.

The outer diameter of cylinder 90 in intermediate section 20 is substantially uniform throughout the cylinder length. However, the inner diameter of the cylinder is larger at annular segment 91 and 103 than throughout the remainder of the cylinder length. The inner diameter transition at segment 91 takes the form of an annular shoulder 115 which faces end section 19 and is axially spaced from the axial extremity of annular 85 of head bearing 69. An annular bulkhead plate 117 is disposed in this space concentrically about the longitudinal axis of the packer. The outer annular surface and inner annular surface of plate 117 each have an endless annular channel defined therein which receives a respective O-ring to effect part of the fluid seal required between the intermediate section 20 and end section 19.

An annular swivel joint 119 has an axial stem portion 120 of reduced diameter which fits concentrically within the central opening in bulkhead plate 117 and is rotatably slidable along the interior annular surface of plate 117. A head portion 121 of swivel joint 119 has a larger diameter and is disposed radially inward of the annular segment 85 of head bearing 69, outside the sealed interior of intermediate section 20. Swivel joint 119 has an axially-extending through hole 123, part of which is tapped to receive a fitting 125 for hose 127 (see FIGS. 5 and 8) which extends through end section 19. Hose 127 carries pressurized air, delivery of which is controlled from the remote operator station, for pressurizing the interior of intermediate section 20 so as to inflate tube 47. A tapped bore 129, which extends axially only partly through swivel plate 119, receives another fitting 131 for hose 130. This hose is connected to a T-fitting 60 and serves as part of the transmission path between end sections 19 and 17 for pressurized air or other gas used to inflate bladder member 21 simultaneously with bladder member 23. This transmission path also includes a radially-extending passage 133 defined in swivel joint 119 and extending from bore 129 to an annular channel or recess 135 defined in the interior annular surface of swivel joint 119. The swivel joint is disposed concentrically about one end of rotatable shaft 43 in rotatably slidable relation therewith. Axial movement of the swivel joint 119 along the rotatable shaft 43 is prevented in one direction by the abutment between enlarged portion 121 of the swivel joint and the bulkhead plate 117. A stop washer 137, or the like, is disposed about shaft 43 to prevent axial movement of the swivel joint in the opposite direction.

One or more radially-extending holes 139 are defined in shaft 43 in axial alignment with swivel joint recess 135 to provide a continuation of the flow transmission path within shaft 43 for the bladder-inflating gas. Suitable O-ring channels are defined in the interior annular surface of swivel joint 119 on opposite axial sides of flow path recess 135 so as to seal the annular joint between shaft 43 and swivel joint 119 against a leakage path for the bladder-inflating gas.

Shaft 43 includes an outer rigid tube 140 within which an inner rigid tube 141 is concentrically and co-extensively disposed. Throughout most of their lengths, the outer diameter of inner tube 141 is smaller then the inner diameter of outer tube 140 so as to define an annular flow path 143 between the tubes. However, outer tube 140 has a reduced inner diameter at its end proximate packer section 17 such that inner tube 141 can be press fit into the outer tube. An annular space of 145 is press fit between the two tubes 140, 141 at end section 19 so that annular flow path 143 is sealed at the tube ends. Both tubes 140 and 141 constitute the rotatable shaft 43 and rotate together when the shaft is driven in the manner descibed hereinbelow.

With specific reference to FIGS. 2, 6 and 7, the inner diameter transition of intermediate section cylinder 90 at segment 91 takes the form of an annular shoulder 146 which faces end section 17 and is axially spaced from the axial extremity of annular segment 100 of head bearing 83. An annular bulkhead plate 147 is disposed in the space concentrically about the longtudinal axis of the packer unit. The outer annular surface and inner annular surface of plate 147 each have an endless annular channel defined therein which receives a respective O-ring to effect pressure seals between plates 147 and each of cylinder 90 and rotatable shaft 43. An annular recess 149 is defined in the surface of plate 147 which faces the interior of intermediate section 20 and extends a short distance radially outward from the inner annular edge of plate 147. Recess 149 receives an annular bearing ring 150 having an inner annular surface which is slidably disposed about shaft 43. Bearing ring 150 and bulkhead plate 147 are joined together, by means of a plurality of screws, or the like, so that they rotate together with respect to shaft 43.

A bulkhead tube member 151 is an annular member disposed in spaced concentric relation about shaft 43, axially adjacent to bulkhead plate 147 and outside the intermediate section enclosure. More specifically, the inboard annular end surface of bulkhead tube member 151 fits into and is received by an annular channel 153 defined in the outboard surface of plate 147. Annularly-spaced, axially-extending through holes defined in plate 147 align with respective tapped axially-extending holes in tube 151 so that the plate 147 and tube 151 may be secured together by means of screws 152.

The outboard side of bulkhead tube 151 is secured, in abutting relationship, to an internal gear ring 155. More specifically, the outboard side of bulkhead tube 151 has an axially recessed portion in which internal gear ring 155 fits. Annularly-spaced, axially-extending through holes defined in gear ring 155 align with respective tapped axially-extending holes in tube 151 so that the gear ring and tube may be secured together by screws 157. The radially-inward annular surface 159 of gear ring 155 is provided with an endless path of gear teeth 160.

A locator motor 161 is mounted in end section 17 with its drive shaft extending parallel to the longitudinal axis of the packer. The drive shaft of motor 161 drivingly engages a gear drive member 163 which is rotatably mounted in a bushing 165 disposed in a suitably provided through hole in head bearing 83. The inboard end of gear drive member 163 terminates in a gear wheel 167 which meshes with the gear teeth 160 of the gear ring 155. Locator motor 161 is thus operable to rotatably drive gear ring 155 which, in turn, rotates bulkhead tube 151, bulkhead plate 147 through a locking pin 158 and intermediate section cylinder 90 about the shaft 43 and the packer longitudinal axis. At the other end of the cylinder 90, bulkhead plate 117 rotates therewith about shaft 43 and the packer axis, with swivel joint 119 floating (i.e. not rotatably engaged) with respect to each of plate 117 and cylinder 90.

An external gear ring 169 is secured (by welding, brazing, or the like) at its inner annular surface to the exterior surface of outer tube 140 of shaft 43. The axial location of gear ring 169 in the packer unit is the same as the axial location of internal gear ring 155 so that gear ring 169 resides concentrically within but annularly spaced from ring 155. The annular outer surface of gear ring 169 is provided with a continuous path of gear teeth 168.

A shaft motor 170 is mounted in end section 17 with its drive shaft extending parallel to the longitudinal axis of the packer. The drive shaft of motor 170 drivingly engages a gear drive member 171 which is rotatably mounted in a bushing 173 disposed in a suitably provided through hole in head bearing 83. The inboard end of gear drive member 171 terminates in a gear wheel 175 having a continuous path of outer teeth which mesh with the teeth 168 of gear ring 169. Shaft motor 170 is thus operable to rotatably drive gear ring 169 which in turn causes shaft 43 to rotate independently of cylinder 90. At the other end of shaft 43, the shaft rotates within the floating swivel joint 119. Electrical control lines for motors 161 and 170 pass from end section 19 to end section 17 through the hollow interior of inner tube 141 of shaft 43.

End section 17 is also provided with a swivel joint 177 (see FIG. 7) which is disposed in rotatably slidable relationship about shaft 43 at an axial location between bulkhead plate 147 and gear ring 169. Swivel joint 177 has a through bore 180, through which shaft 43 extends, and a depending portion 181. An annular channel or recess 179 is defined in the walls of the through bore and communicates with a radially-extending passage 183. The axial position of swivel joint 177 on shaft 43 is such that channel 179 is aligned with one or more holes 185 defined through outer tube 140 of shaft 43. These holes 185 conduct pressurized fluid from annular passage 143 to the swivel joint channel 179 which causes the fluid to flow through passage 183 to a hose fitting bore 187. Hose fitting bore 187 is adapted to receive hose 77 on the outboard of swivel joint 177. Hose 77 connects to port 75 in cylindrical member 70 to permit inflation of bladder member 21. This hose is not illustrated in FIG. 6 in order to preserve clarity and understanding of the drawing. It can be seen, however, from FIGS. 2, 5 and 6, that air is supplied to inflate both bladder members 21 and 23 simultaneously by virtue of the T-connection 60, hose 130, swivel joint 119, annular passage 143, swivel joint 177 and hose 77.

Referring now to FIGS. 2-4, 9 and 10, the inflatable tube 47 is an elongated plastic bag which has an open end 183 and a closed end 181. The closed end has an elongated strip or tail 180 secured thereto. The other end of tail 180 is secured to shaft 43, by screws or the like, in a manner to permit the tail and tube 47 to be wound about the shaft. The other end 183 of tube 47 is secured about the periphery or border egress slot 45 in cylinder 90. More particularly, egress opening or slot 45 is defined in a slotted frame member 185 disposed over an opening in cylinder 90 and secured to the cylinder by means of screws, or the like. The open end of tube 47 is turned inside out (i.e. everted) about a gasket 187 and secured and sealed between the cylinder 90 and frame member 185. Thus, when the tube is wound about shaft 43, a short length of the open end of the tube extends to egress slot 45 where it seals the interior of cylinder 90 from the exterior environment. The only opening to the exterior of cylinder 90 is through the inside of tube 47 which is deflated and compressed as it is wound about shaft 43. If the interior of cylinder 90 is pressurized, as by applying pressurized air or other gas from hose 127 through hole 123 in swivel 119, the pressure tends to force the tube 47 through egress slot 45. However, since the open end 183 of the tube is everted and anchored at the egress border, the pressurized air tends to evert the tube further, projecting the increasingly everting length of tube out through slot 45. It may be necessary to assist this projection of tube 47 by operating shaft motor 170 to pay out the wound tube as the tube everts. When the closed end 181 of tube 47 is unwound from shaft 43, the tube tail 180 begins to unwind and project inside the everted tube. The fully extended tube 47, with tail 180 extending inside the tube from shaft 43, is illustrated in FIG. 9. In order to retract the tube, the shaft motor 170 is driven in the opposite direction to pull the tail 180 and closed tube end 181 back toward the shaft where the tail and tube are rewound.

The various parts of the apparatus described herein, except where otherwise indicated and except for gaskets, O-rings and the like, are made of suitable metal such as aluminum, aluminum alloy, steel, etc. It is possible, however, to make these parts out of suitable plastic materials for different purposes.

The invention as described hereinabove involves a method and apparatus for translating a packer unit along a main pipe line, such as a sewer line 10, until intermediate packer section 20 is axially aligned with lateral pipe line 11, creating a sealed space in main pipe line 10 about the lateral pipe line entrance, angularly aligning the egress opening 45 for the tube 47 with the lateral pipe line opening, projecting the tube 47 into the lateral pipe line 11 to effect a sealed annular space in the lateral pipe line about the projected tube, and injecting leak-detecting test fluid and, if necessary, leak-sealing fluid into the sealed region. The details specifically described and illustrated for the apparatus of the preferred embodiment and for effecting these functions constitute the preferred embodiment only and are by no means limiting on the present invention. In addition, the techniques described herein for sewer lines may be utilized for other fluid-conducting pipe systems.

While I have described and illustrated a specific embodiment of my invention, it will be clear that variations of the details of construction which are specifically illustrated and described herein may be resorted to without departing from the true spirit and scope of the invention as defined in the appended claims.

What is claimed is:

1. A pipe sealing apparatus for use in detecting and sealing leaks in a branch pipe extending generally transversely from a main pipe, the main and branch pipes meeting at a flow communication interface in the form of a peripheral opening in the main pipe, said apparatus comprising:
    an elongated member having a longitudinal axis and adapted to be translated longitudinally through the main pipe, said elongated member having a pair of axially spaced hollow end sections and a hollow intermediate section disposed between said end sections, said intermediate section having a pheripheral egress opening defined therein;
    selectively inflatable bladder means disposed peripherally about each of said end sections, said bladder means having a deflated condition wherein their transverse cross-section is smaller then the cross-section of said main pipe, and an inflated condition wherein the bladder means are expanded into continuous peripheral contact with the main pipe to define a sealed space between the end sections and about said intermediate section;
    means for selectively inflating said bladder means;
    means for selectively rotating said intermediate section about said longitudinal axis relative to said end sections to permit angular alignment of said egress opening with said flow communication interface;
    a selectively inflatable elongated tube secured at one end within said intermediate section and having a collapsed condition wherein the tube resides substantially entirely within said intermediate section, and an inflated condition wherein said tube projects transversely of said intermediate section through said egress opening in said intermediate section and into said branch pipe when said egress opening and said flow communication interface are angularly aligned, said tube having a distal portion in its inflated condition which is expanded against the branch pipe to seal a section of the branch pipe through which the tube extends;
    means for selectively inflating said tube; and
    means for selectively injecting fluid into the sealed space of the main tube and the sealed section of the branch tube.

2. The apparatus according to claim 1 further comprising:
    a rotatable shaft extending longitudinally in said intermediate section about a rotation axis;
    means for selectively rotating said shaft about said rotation axis relative to said intermediate section;
    wherein said one end of said inflatable tube is secured to said shaft and said inflatable tube, in its collapsed condition, is wound about said shaft;
    wherein said egress opening in said intermediate section has a rim bordering its periphery;
    wherein said inflatable tube has a second end which is open and peripherally sealed along said rim of said egress opening; and
    wherein said means for selectively inflating said inflatable tube includes means for delivering pressurized fluid into said intermediate section to pressurize the space surrounding said tube and thereby cause the tube to evert and project out through the peripheral opening of the intermediate section.

3. The apparatus according to claim 2 wherein said inflatable tube includes a non-inflatable tail portion at said one end by which said one end is secured to said shaft, said tail portion extending within said tube along the entire tube length when the tube is fully inflated.

4. The apparatus according to claim 3 wherein said distal portion of said tube is a relatively short length of the tube to which said tail portion is connected and which constitutes the extreme end of the tube in said branch pipe when the tube is fully inflated.

5. The apparatus according to claim 2 further comprising first fluid flow passage means for conducting pressurized gas to inflate the bladder means at both end sections simultaneously, said first fluid passage means including a segment which is internal to said rotatable shaft.

6. The apparatus according to claim 5 wherein said rotatable shaft includes two rigid substantially concentrically disposed tubes having an angular space therebetween, which angular space constitutes said segment of said first fluid flow passage.

7. The apparatus according to claim 6 further comprising at least one electrical cable extending longitudinally between said end sections interiorly of said two rigid tubes.

8. The apparatus according to claim 7 wherein said one of said end sections constitutes a motor section and the other end section constitutes a chemical section, and
 wherein said means for rotating said intermediate section comprises a first motor disposed in said motor section and means for drivingly engaging said intermediate section and said first motor;
 wherein said means for selectively rotating said shaft comprises a second motor disposed in said motor section and means for drivingly engaging said rotatable shaft and said second motor;
 and wherein said means for selectively injecting fluid includes a chemical egress port defined in the periphery of said chemical section.

9. The apparatus according to claim 8 wherein said first fluid flow passage means further comprises:
 a first swivel joint having a through hole disposed for free slidable rotation about said rotatable shaft proximate said chemical section and including an inlet fitting for receiving pressurized fluid from a hose fitting, an annular recess defined in said through hole, and internal passage means interconnecting said annular recess with said inlet fitting;
 a second swivel joint having a through bore disposed for free slidable rotation about said rotatable shaft proximate said motor section and including an outlet fitting for delivering pressurized fluid to a hose fitting, an annular channel defined in said through bore and an internal passage interconnecting said annular channel and said outlet fitting;
 at least one opening defined in said rotatable shaft for providing flow communication between said annular recess for said first swivel joint and the annular space defined between said two rigid grooves; and
 at least a further opening defined in said rotatable shaft for providing flow communication between said annular channel in said second swivel joint and the annular space defined between said two rigid tubes.

10. The apparatus according to claim 8 further comprising indicator means, visible from beyond said motor end section and driven by said first motor, for indicating the rotational position of the egress opening in said intermediate section.

11. The apparatus according to claim 1 further comprising indicator means rotatable with said intermediate section, for indicating the rotational position of said egress opening of said intermediate section.

12. The method of detecting and sealing leaks in a branch pipe extending transversely from a main pipe, the main and branch pipes meeting at a flow communication interface which takes the form of a peripheral opening in the main pipe, said method comprising the steps of:
 translating a packer apparatus through said main pipe until an opening in an intermediate section of said packer apparatus is longitudinally aligned with said flow communication interface;
 sealing off a section of said main pipe which includes said flow communication interface by inflating bladder members disposed at opposite longitudinal ends of said intermediate section;
 rotating said intermediate section about a longitudinal axis of said packer apparatus until said opening in said intermediate section is angularly aligned with said flow communication interface;
 inflating a collapsable tube, contained in a collapsed state in said intermediate section, while projecting the inflating tube out through said opening in said intermediate section and said flow communication interface and into said branch pipe;
 creating a seal in the branch pipe with a portion of the inflated tube such that the sealed branch pipe portion is in flow communication with the sealed-off section of the main pipe; and
 injecting fluid under pressure into the sealed section of the main pipe and the sealed branch pipe portion.

13. The method according to claim 12 wherein the step of inflating includes everting said collapsable tube into said branch pipe while unreeling it from a rotatable shaft in said intermediate section.

14. The method according to claim 13 wherein the step of sealing off a section of the main pipe by inflating bladder members includes tranferring pressurized gas to one of the bladder members through an annular space within said rotatable shaft.

15. The method according to claim 12 wherein the step of injecting includes injecting a test fluid under pressure into the sealed-off section of the main pipe and the sealed branch pipe portion, and further including the step of monitoring the pressure in the sealed-off main pipe section to determine if there is a leak in the sealed branch pipe portion.

16. The method according to claim 15 further comprising the step of, after determining that there is a leak in the sealed branch pipe portion, injecting flowable sealant material into the sealed branch pipe portion to seal the leak.

17. The method according to claim 16 first comprising the steps of, after injecting the sealed material, deflating the collapsable tube and retracing it into the intermediate section.

18. The method according to claim 15 further comprising the step of, after determining that there is no leak in the sealed branch pipe portion, deflating the collapsable tube and retracing it into the intermediate section.

19. The method according to claim 12 wherein the step of injecting includes injecting a flowable sealant material into the sealed-off main pipe section and the sealed branch pipe portion.

20. The method of sealing leaks in a branch pipe extending generally transversely from a main pipe, the main and branch pipes meeting at a flow communication interface which takes the form of a peripheral opening in the main pipe, said method comprising the steps of:
- inflating a collapsible tube while projecting the inflating tube into said branch pipe;
- creating a seal in the branch pipe with a portion of the inflated tube such that the seal branch pipe portion is in flow communication with the main pipe; and
- injecting fluid under pressure into the sealed branch pipe portion.

21. The method according to claim 20 wherein the step of inflating includes everting said collapsible tube into said branch pipe.

22. The method according to claim 20 wherein the step of injecting includes injecting a flowable sealant material into the sealed branch pipe portion.

* * * * *